United States Patent
Sakata

(10) Patent No.: US 7,330,402 B2
(45) Date of Patent: Feb. 12, 2008

(54) PORTABLE DEVICE, METHOD OF NOTIFYING APPLICATION EXECUTION IN PORTABLE DEVICE, AND COMPUTER PRODUCT

(75) Inventor: Takuya Sakata, Hyogo (JP)

(73) Assignees: Fujitsu Limited, Kawasaki (JP); NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 11/228,240

(22) Filed: Sep. 19, 2005

(65) Prior Publication Data

US 2006/0007786 A1     Jan. 12, 2006

Related U.S. Application Data

(63) Continuation of application No. PCT/JP03/07226, filed on Jun. 6, 2003.

(51) Int. Cl.
*G04B 47/00* (2006.01)
*G04B 47/02* (2006.01)
*H04B 1/38* (2006.01)
*H04M 1/00* (2006.01)

(52) U.S. Cl. .................. 368/10; 368/13; 455/90.3; 455/575.3

(58) Field of Classification Search ............ 368/3, 368/10, 13; 455/90.3, 566, 575.3
See application file for complete search history.

(56) References Cited

U.S. PATENT DOCUMENTS

| | | | |
|---|---|---|---|
| 6,269,256 B1 * | 7/2001 | Nakamura | 455/567 |
| 6,434,404 B1 * | 8/2002 | Claxton et al. | 455/575.3 |
| 6,650,913 B1 * | 11/2003 | Hayashi | 455/575.3 |
| 6,944,481 B2 * | 9/2005 | Hama et al. | 455/566 |
| 7,096,045 B2 * | 8/2006 | Yoshinaga | 455/567 |
| 2001/0046880 A1 * | 11/2001 | Hosonuma | 455/550 |
| 2002/0193143 A1 * | 12/2002 | Miyashita | 455/556 |

FOREIGN PATENT DOCUMENTS

| | | |
|---|---|---|
| JP | 6-205088 | 7/1994 |
| JP | 11-353283 | 12/1999 |
| JP | 2002-300270 | 10/2002 |
| JP | 2002-320006 | 10/2002 |

* cited by examiner

*Primary Examiner*—Vit W Miska
(74) *Attorney, Agent, or Firm*—Westerman, Hattori, Daniels & Adrian, LLP.

(57) ABSTRACT

In a foldable portable device, a detecting unit detects folding (closing) or unfolding (opening) of the portable device. When the portable device is folded, a first timer starts counting time. The first timer can count time until a first time. When the portable device is unfolded, a second timer starts counting time. The second timer can count time until a second time. The operation of detection unit is invalidated based on the time counted in the first and the second timers.

10 Claims, 5 Drawing Sheets

PORTABLE DEVICE, METHOD OF NOTIFYING APPLICATION EXECUTION IN PORTABLE DEVICE, AND COMPUTER PRODUCT

This application is a continuation of international application PCT/JP2003/007226 filed on Jun. 6, 2003.

BACKGROUND OF THE INVENTION

1. Field of the Invention

The present invention relates to a portable terminal unit having a foldable casing.

2. Description of the Related Art

Foldable portable telephones have appeared in the market. These portable telephones have a casing having two discrete pieces that can be folded/unfolded (opened/closed) at a hinge. A conventional portable telephone of this type has been disclosed in Japanese Patent Application Laid-open Publication Nos. 2002-320006 and H11-353283.

A display section is arranged in one of the pieces (upper lid) and an operation section is arranged in other piece (lower lid). An opening-closing detection switch detects change in state of the casing, i.e., change of folded to unfolded state or vice versa. Based on the change in the state of the casing, booting of applications is controlled. For example, a display is turned ON when the casing is opened, and the display is turned OFF when the casing is closed.

However, if the casing is opened/closed repeatedly, due to repeated operation of the opening-closing detection switch (chattering), the operation of the opening-closing detection switch becomes unstable.

Conventionally, timer is counted and detection of a change in state of the casing is performed only when a predetermined time elapses. The predetermined time for detection of change of state from open state to close state and vice versa is set same, moreover, it is set short so that the portable telephone can be operated almost at the same time as it is opened.

SUMMARY OF THE INVENTION

It is an object of the present invention to at least solve the problems in the conventional technology.

A portable device according to one aspect of the present invention has a first part, a second part, and a hinge portion. The portable device includes a closed state in which the first part and the second part rotate toward each other and an open state in which the first part and the second part rotate away from each other along the hinge portion. The portable device includes an opening-closing detection unit configured to detect a change in a state from the closed state to the open state or vise versa; a first timer that counts time until a first time when the opening-closing detection unit detects that a change in the state from the closed state to the open state; a second timer that counts time until a second time when the opening-closing detection unit detects that a change in the state from the open state to closed state; and an inactivating unit configured to inactivate the opening-closing detection unit based on time counted in any one of the first timer and the second timer.

A method of controlling a portable device according to another aspect of the present invention, wherein the portable device has a first part, a second part, and a hinge portion, wherein the portable device includes a closed state in which the first part and the second part rotate toward each other and an open state in which the first part and the second part rotate away from each other along the hinge portion. The method includes detecting a change in a state from the closed state to the open state or vise versa; counting time until a first time when detecting a change in the state from the closed state to the open state, and counting time until a second time when detecting a change in the state from the open state to closed state; and inactivating the detecting based on time counted in counting.

A computer-readable recording medium according to another aspect of the present invention stores a computer program that implements on a computer a method of controlling a portable device according to the present invention.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments according to the present invention are described below in detail with reference to the accompanying diagrams.

Figure 1:
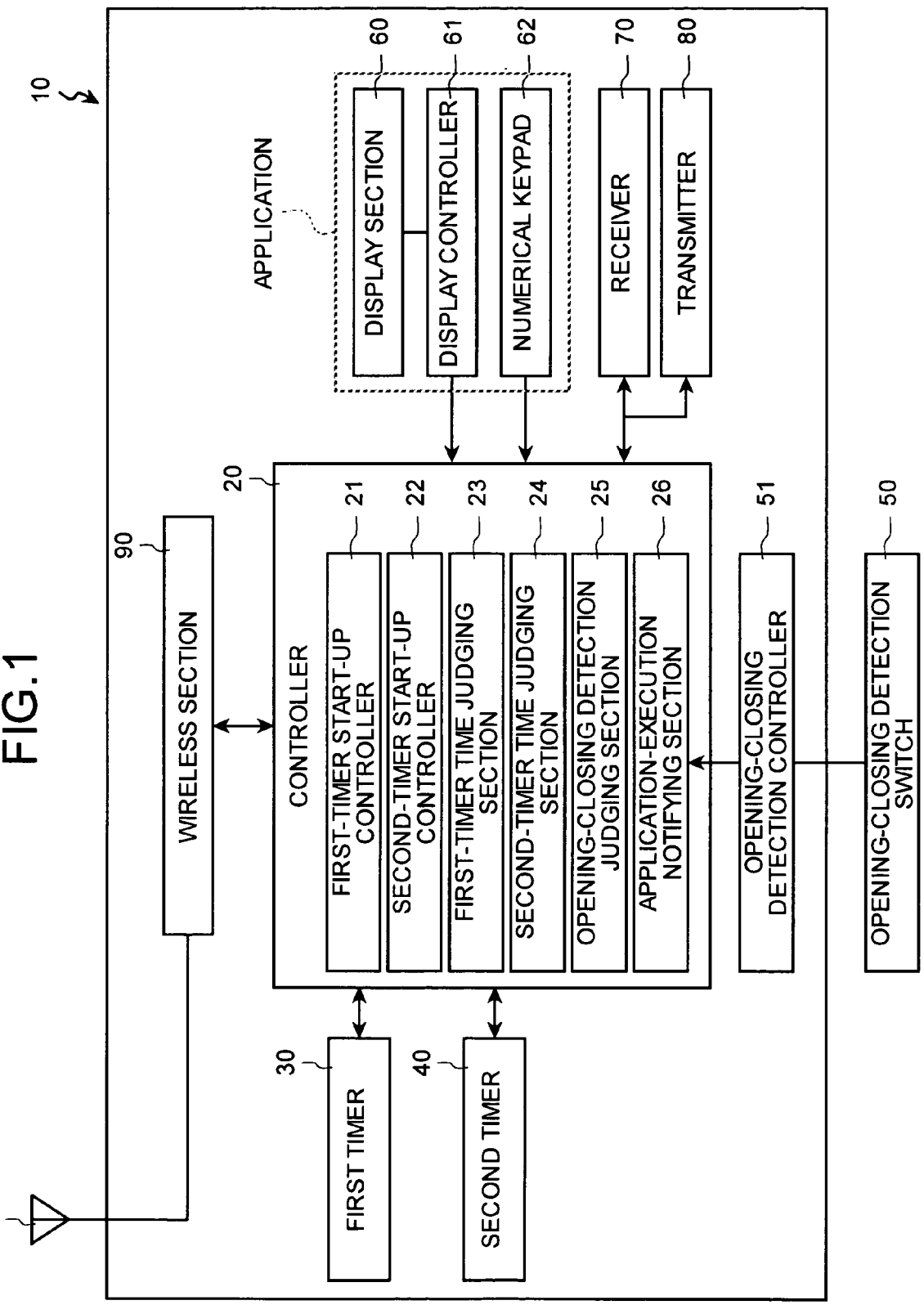
FIG. 1 is a functional block diagram of a portable terminal unit according to an embodiment of the present embodiment.

FIG. 1 is a block diagram of a portable terminal unit according to an embodiment of the present invention. A portable telephone has been considered here as an example of the portable terminal unit for the sake of the explanation.

A portable telephone 10 shown in FIG. 1 includes an upper part (upper lid) that has a display section 60 and a lower part (lower lid) that has an operation section such as a numerical keypad 62, which are rotatably connected by a hinge mechanism (not shown). Thus, the upper part and the lower part can be folded along the hinge mechanism. When not is use, the portable telephone 10 is folded. When using, the portable telephone 10 is unfolded. Mails can be sent or received, or telephone calls can be made by using the display section 60 and the numerical keypad 62 (operation section) when the portable telephone 10 is unfolded.

This mobile telephone has a first timer that has a first-timer time set, which is an opening time of the casing (upper lid) and a second timer that has a second-timer time set, which is a folding time of the casing. When the opening of the casing is detected, the first timer starts counting, and when the closing of the casing is detected, the second timer starts counting.

The first-timer time is shorter than the second-timer time. Therefore, when the casing is opened, an application such as that of the display section etc. starts instantly, because, the first-timer time is short. And, when the casing is folded, the application such as that of the display section etc. is performed assuredly, thereby achieving assuredly the stability of the entire system.

The following is a description of a structure of the portable telephone 10 according to the present embodiment. As shown in FIG. 1, the portable telephone 10 includes a controller 20, a first timer 30, a second timer 40, an opening-closing detection switch 50, an opening-closing detection controller 51, a display section (LCD) 60, a display controller 61, a numerical keypad 62, a receiver 70, a transmitter 80, a wireless section 90, and an antenna 91. The controller 20 includes a first-timer start-up controller 21, a second-timer start-up controller 22, a first-timer time judging section 23, a second-timer time judging section 24, an opening-closing detection judging section 25, and an application-execution notifying section 26.

The opening-closing detection switch 50 has a function of detecting the opening and closing of the casing of the portable telephone 10. The opening-closing detection controller 51 has a function of transmitting a detection signal corresponding to a detection result according to a detection signal that is detected by the opening-closing detection switch 50 to the controller 20.

The first timer 30 has a function of controlling the opening time of the casing based on the first-timer time. The second timer 40 has a function of controlling the folding time of the casing based on the second-timer time.

The first-timer start-up controller 21 has a function of starting the first timer 30 when the opening of the casing is detected by the opening-closing detection switch 50. The second-timer start-up controller 22 has a function of starting the second timer 40 when the folding of the casing is detected by the opening-closing detection switch 50. The first-timer time judging section 23 has a function of making a judgment of whether the first-timer time that is set by the first timer 30 has elapsed or not.

The second-timer time judging section 24 has a function of making a judgment of whether the second-timer time that is set by the second timer 40 bas been elapsed or not. The opening-closing detection judging section 25 has a function of making a judgment of opening or closing based on the detection result (ON/OFF) that is detected by the opening-closing detection switch 50.

The application-execution notifying section 26 has a function of notifying the execution of a predetermined application. As it is described later, in this example, after the first-timer time is elapsed by the starting of the first timer 30, if there is not change in the opening status of the casing, the execution for the predetermined application is notified.

The receiver 70 functions as a speaker for receiving sound, and the transmitter 80 functions as a microphone for transmitting sound. The wireless section 90 has a function of demodulating a wireless signal that is received via the antenna 91 and generating a sound signal from the receiver 70 and a function of converting the sound that is input from the transmitter 80 to a wireless signal and transmitting via the antenna 91.

The display section 60 has a function of displaying data such as communication information and this display section 60 is displayed by a light source such as a back light that is installed on a back side. The display controller 61 has a function of controlling turning on and turning off light of the display section 60. The numerical keypad 27 has a function of inputting telephone numbers and other data.

Figure 2:
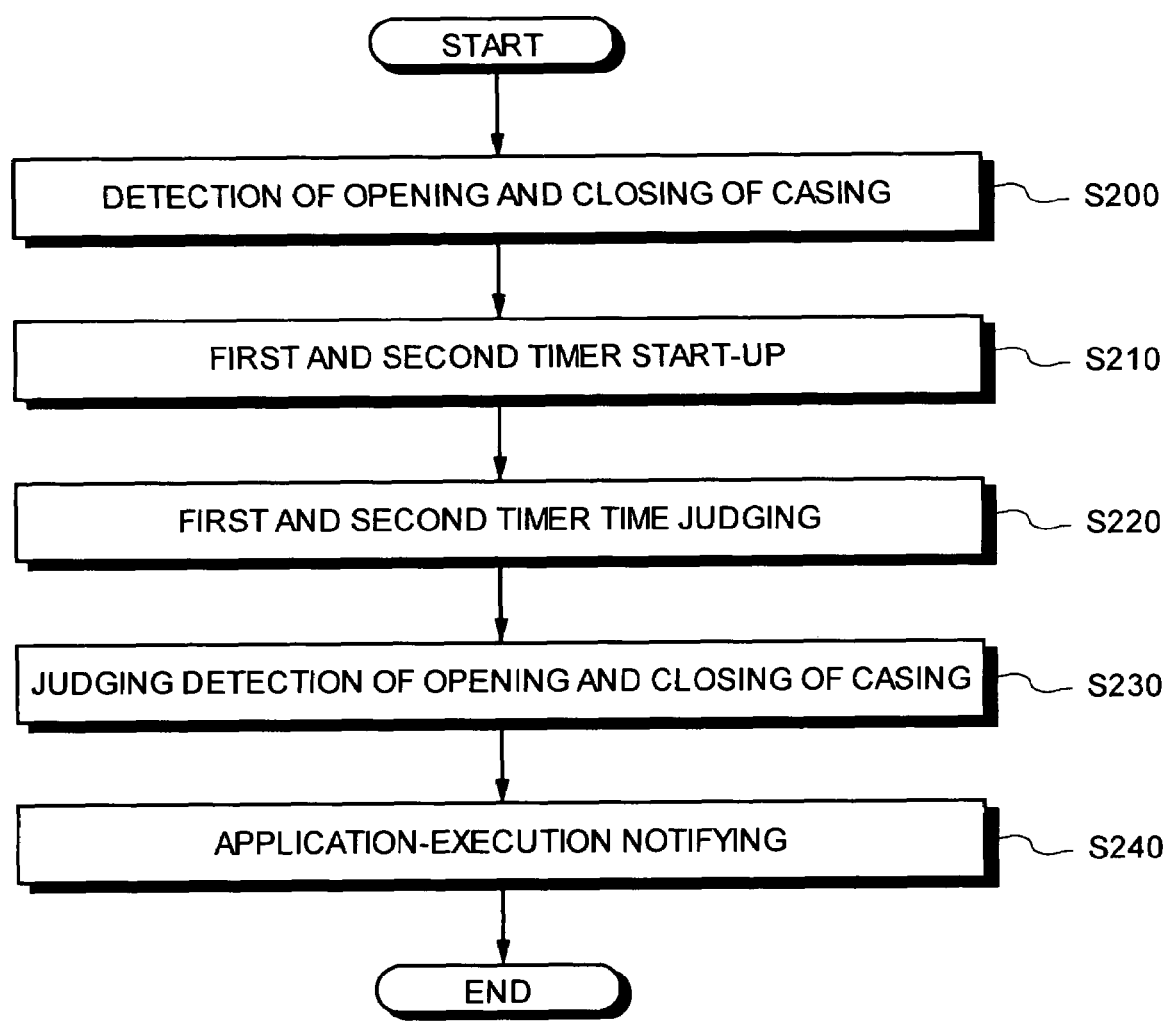
FIG. 2 is a flowchart of a process procedure performed by the portable terminal unit.

FIG. 2 is a flowchart of a basic processing procedure of the method of notifying application execution in portable terminal unit according to the present invention. In other words, the processing procedure of the method of notifying application execution according to the present invention includes mainly five steps of (1) detection of opening and closing of casing (step S200), (2) first and second timer start-up (step S210), (3) first and second timer time judging (step S220), (4) judging detection of opening and closing of casing (step S230), and (5) application-execution notifying (step S240). To start with, steps 1 to 5 are described below:

(1) At the step of detection of opening and closing of casing, based on the detection result by the opening-closing detection switch 50, it is detected whether the casing is open or folded;

(2) At the first and second timer start up step, based on the detection result that is detected at the step of detection of opening and closing of casing, any one of the first timer and the second timer is started. Concretely, when the opening of the casing is detected at the step of detection of opening and closing of casing, the first timer is started and when the folding of the casing is detected, the second timer is started;

(3) At the first and second timer time judging step, the first and the second timer time that started at the first and second timer start-up step is judged to be as time up. In this example, as described later, the first-timer time and the second-timer time are set to be different;

(4) At the judging detection of opening and closing of casing step, after the predetermined time is elapsed at the first and second timer time judging step, once again a judgment of whether the casing is opened or closed is made by the opening-closing detection switch 50;

(5) At application-execution notifying step, an execution of a predetermined application is notified when there is no change in the opening and closing at the judging detection of opening and closing of casing step.

Figure 3:
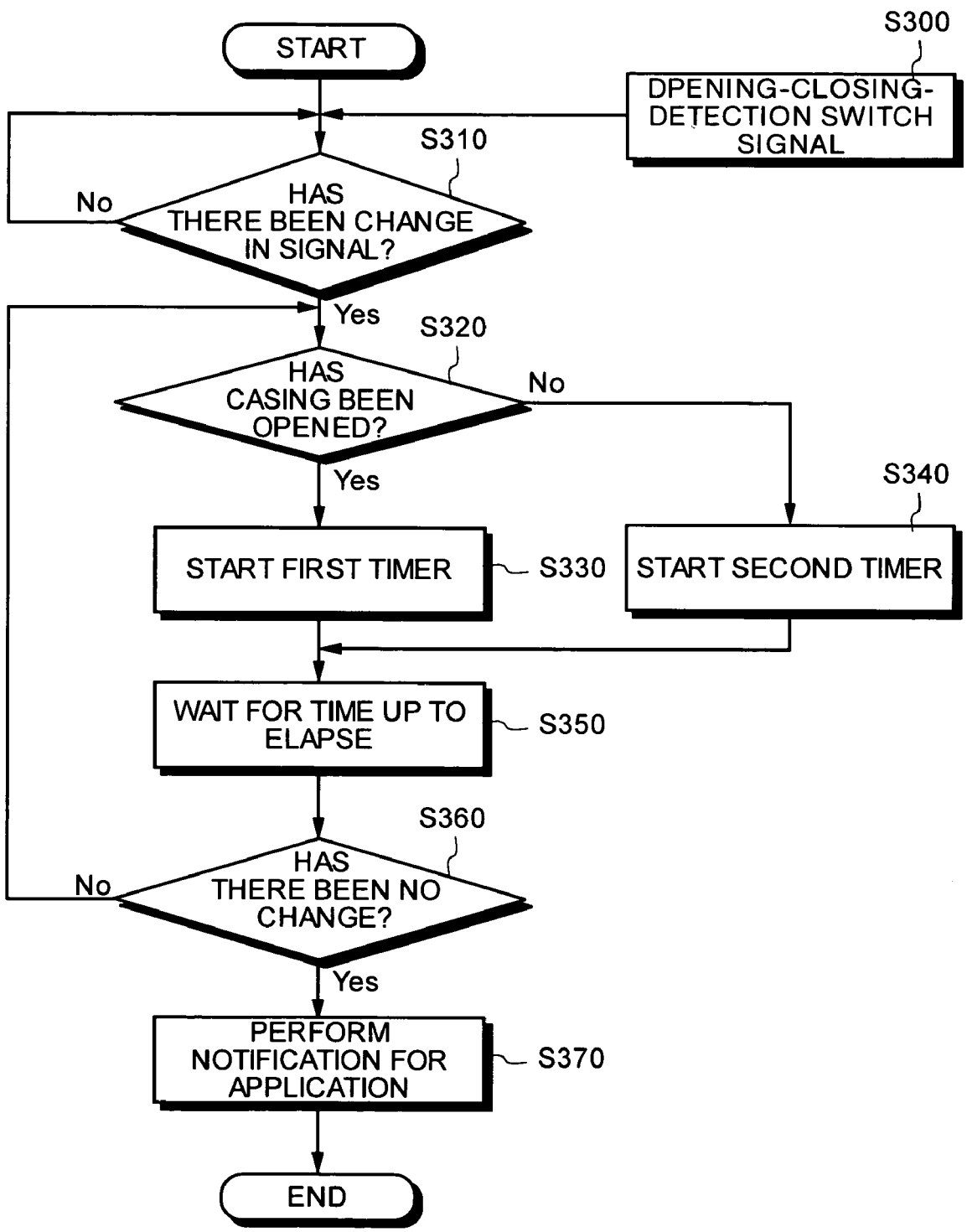
FIG. 3 is a flowchart of another process procedure performed by the portable terminal unit.

The following is a description of the processing procedure of the portable terminal unit according to the embodiment. FIG. 3 is a flowchart of a processing procedure of the application-execution notifying by the portable terminal unit according to the present embodiment. In this case, in the following description, it is assumed that when the casing of the portable telephone 10 is opened, the detection signal by the opening-closing detection switch 50 becomes ON and when the casing is closed the detection signal becomes OFF.

In other words, as shown in the flow chart in FIG. 3, to start with, a signal from the opening-closing detection switch 50 is received (step S300). A judgment of whether there is a change in the signal from the opening-closing detection switch 50 is made (step S310). According to the judgment, if there is a change in the signal (Yes at step S310), a judgment of whether the casing is opened or not at step S320 is made.

Further, if the casing is judged to have been opened at step S320 (Yes at step 320), the first timer 30 starts (step S330). The first-timer time (for example about 60 mS) is set in advance in the first timer 30. The first-timer time that is set by the first timer 30 is a time till transmitting a notification for starting an application by the first timer 30 when the casing is opened.

On the other hand, when the casing is judged to have been closed at step S320 (No at step S320), the second timer 40 starts (step S340). The second-timer time (for example about 200 mS to 500 mS) is set in advance in the second timer 40. The second-timer time that is set by the second timer 40 is time till transmission of notification for ending the application by the second timer 40 when the casing is closed.

In this case, a process when the casing is opened is described in a description based on the following flow chart.

Coming back to the flow chart in FIG. 3, as the first timer 30 starts at step S330, then at step S350 elapsing of the first-timer time is awaited (waiting for time up).

Further, according to the judgment at step S360, a change in the signal is detected by the opening-closing detection switch 50. Concretely, if there is no change in the signal according to the opening-closing detection switch 50 (Yes at step S360), a change in the status of the casing is let to be effective (in this example, a status in which the casing is opened) and a notification for a predetermined application is performed (step S370). Concretely, if the application is the display section 60, in this example, in the status of the casing opened, display light is turned on instantly (about 60 mS) by the display section 60.

On the other hand, if there is a change in the status of opening and closing by a judgment at step S360 (No at step S360), the process returns to step S320 and performs steps from S320 onward.

Thus, when the casing is opened, the first timer 30 starts counting, when the casing is closed, the second timer 40 starts counting, and the first-timer time is set shorter than the second-timer time.

Moreover, the opening and closing of the casing is performed based on the detection result by the opening-closing detection switch 50. After elapsing of the first-timer time or the second-timer time, an execution of a predetermined application is notified. In this case, if the predetermined application is let to be the display section 60, the opening of the casing is detected by the opening-closing detection switch 50 and after elapsing of the first-timer time the display of the display section 60 is performed.

On the other hand, if the folding of the casing is detected by the opening-closing detection switch 50, after elapsing of the second-timer time, the display of the display section 60 is turned off. In this case, according to this example, as described before, since the first-timer time is set to be shorter than the second-timer time, as the display of the display section is performed instantly along with the opening of the casing, it is possible to prevent the delay in turning on the display section 60 when the casing is opened, thereby improving the convenience for the user.

Moreover, by setting the second-timer time to be comparatively longer than the first-timer time, while folding the casing, the display of the display section 60 is not turned off instantly and is performed comparatively slowly. By this, the application such as the display section 60 can be ended assuredly. For example, after the user has closed the casing of the portable telephone, even in a case of closing the casing suddenly, since the display of the display section 60 is not turned off, the operation by the portable telephone can be performed continuously.

However, the portable terminal unit and the method of notifying application execution in portable terminal unit can be realized by running a computer program that is prepared in advance in a computer system such as a personal computer or a work station.

Figure 4:
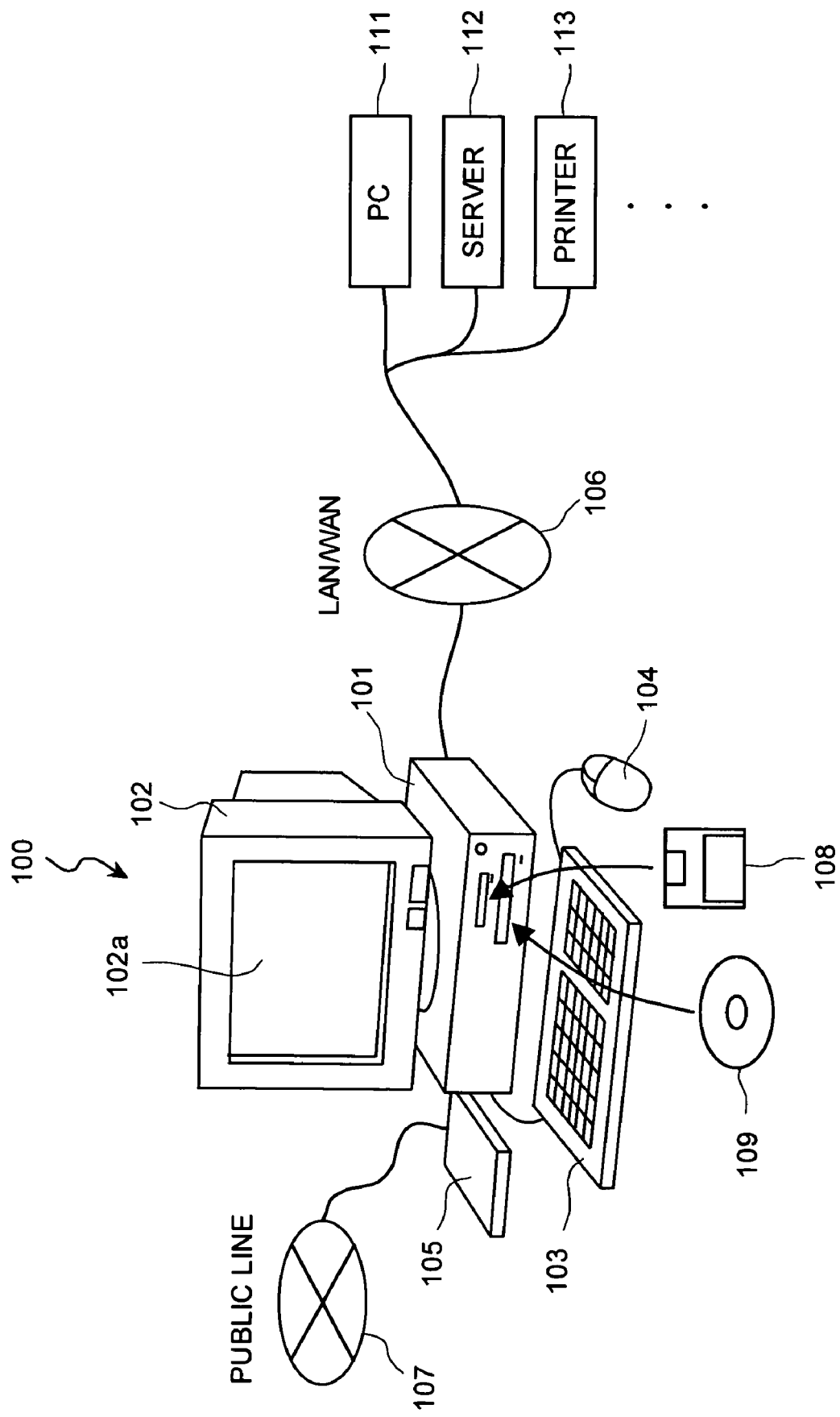
FIG. 4 is a schematic of a computer system according to another embodiment of the present invention.
Figure 5:
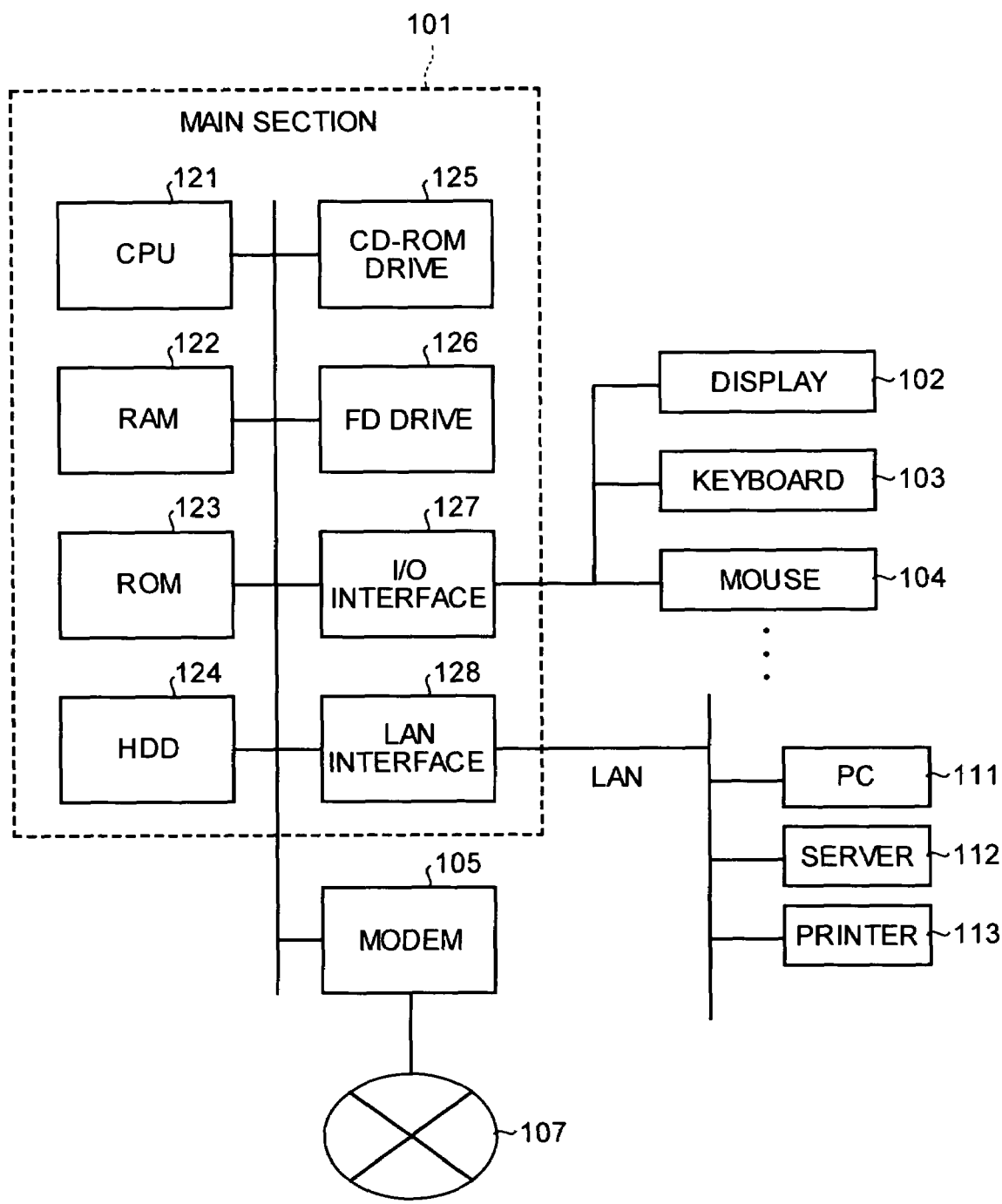
FIG. 5 is block diagram of a main section in the computer system shown in FIG. 4.

FIG. 4 is a diagram of a system configuration of a computer system according to the present embodiment and FIG. 5 is a block diagram of a structure of a main section in the computer system shown in FIG. 4.

As shown in FIG. 4, a computer 100 according to this embodiment includes a main section 101, a display 102 for displaying information such as image etc. on a display screen 102a by an instruction from the main section 101, a keyboard 103 for inputting variety of information in the computer system 100, and a mouse 104 for designating any position on the display screen 102a of the display 102.

Moreover, the main section 101 in this computer system 100, as shown in FIG. 5, includes a CPU (Central Processing Unit) 121, a RAM (Random Access Memory) 122, a ROM (Read Only Memory) 123, an HDD (Hard Disc Drive) 124, a CD-ROM drive 125 that takes in a CD-ROM 109, an FD drive 126 that takes in a flexible disc (FD) 108, the display 102, an I/O interface 127 that connects the keyboard 103 and the mouse 104, and a LAN interface 128 to connect to a local area network or a wide area network (LAN/WAN) 106.

Moreover, a modem 105 for connecting to a public line 107 such as the Internet is connected to the computer system 100 as well as other computer system (PC) 111, a server 112, and a printer 113 are connected via the LAN interface 128 and the LAN/WAN 106 to the computer system 100.

The computer system 100 realizes the method of notifying application execution in portable terminal unit by reading and running an application execution notifying program that is recorded in a predetermined recording medium.

In this case, the predetermined recording medium includes apart from portable physical media such as the flexible disc (FD) 108, the CD-ROM 109, an MO disc, a DVD disc, a magnetic optical disc, and IC card, all sorts of recording media that can record a computer readable application execution notifying program that is readable by the computer system 100, such as a fixed physical medium like the hard disc drive (HDD) 124, the RAM 122, and the ROM 123 that is provided inside or outside the computer system, a communication medium that holds a computer program for a short period while transmitting the computer program such as the public line 107 that is connected via the modem 105 and the LAN/WAN 106 to which the other computer system 11 and the server 112 are connected.

In other words, the application execution notifying program in the portable terminal unit is a computer readable program that is recorded in a recording medium such as the portable physical recording medium, the fixed physical recording medium, and the communication medium. The computer system 100 realizes the method of notifying application execution in portable terminal unit by reading the application execution notifying program from a recording medium of such type.

The application execution notifying program is not restricted to be executed only by the computer system 100. The present invention is applicable similarly when the other computer system 111 or the server 112 executes the application execution notifying program or when the other computer system 111 and the server 112 execute the application execution notifying program together.

A portable telephone has been described as an example of a portable terminal unit. However, the present invention is not restricted only to the folding portable telephone and can be applied similarly to a notebook personal computer, a PDA (Personal Digital Assistants), and special terminal units for the Internet such as an electronic diary.

Thus, when the opening-closing detection unit 50 detects the opening of the casing of the portable telephone 10, the first timer 30 in which the first-timer time is set starts and when the opening-closing detection unit 50 detects the folding of the casing of the portable telephone 10, the second timer 40 in which the second-timer time is set starts. Therefore, when the casing of the portable telephone is opened, by starting instantly the application such as that of the display section 60 there is an improvement in the convenience for the user. When the casing is folded, the application of the display section 60 ends assuredly because of the second-timer time that is set to be longer than the first-timer time. This enables to improve the stability and the reliability of the entire system.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A portable device that has a first part, a second part, and a hinge portion, wherein the portable device includes a closed state in which the first part and the second part rotate toward each other and an open state in which the first part and the second part rotate away from each other along the hinge portion, comprising:
   an opening-closing detection unit configured to detect a change in a state from the closed state to the open state or vise versa;
   a first timer that counts time until a first time in response to the opening-closing detection unit detecting a change in the state from the closed state to the open state; and
   a second timer that counts time until a second time in response to the opening-closing detection unit detecting a change in the state from the open state to closed state;
   wherein said first time is set to be a time on which an application program is set to ON, and said second time is set to be a time on which the application program is set to OFF, and
   wherein said first time counted by the first timer is set shorter than the second time counted by the second timer, said application program controls a display unit, and said first time is set shorter than the second time such that display on the display unit is performed without delay when the open state is detected, and said second time is set longer than said first time such that display on the display unit is not ended immediately when the closed state is detected.

2. The portable device according to claim 1, wherein the first time and the second time are different.

3. The portable device according to claim 1, further comprising an operating unit in the second part, and wherein the display unit is in the first part.

4. The portable device according to claim 3, wherein the display unit includes a light that turns ON when the time counted by the first timer reaches the first time.

5. The portable device according to claim 3, wherein the display unit includes a light that turns OFF when the time counted by the second timer reaches the second time.

6. The portable device according to claim 1, further comprising:
   an executing unit that executes a function based on time counted in any one of the first timer and the second timer.

7. A method of controlling a portable device that has a first part, a second part, and a hinge portion, wherein the portable device includes a closed state in which the first part and the second part rotate toward each other and an open state in which the first part and the second part rotate away from each other along the hinge portion, comprising:
   detecting a change in a state from the closed state to the open state or vise versa; and
   counting time until a first time when detecting a change in the state from the closed state to the open state, and counting time until a second time when detecting a change in the state from the open state to closed state;
   wherein said first time is set to be a time on which an application program is set to ON, and said second time is set to be a time on which the application program is set to OFF, and
   wherein said first time is set shorter than the second time, said application program controls a display unit, and said first time is set shorter than the second time such that display on the display unit is performed without delay when the open state is detected, and said second time is set longer than said first time such that display on the display unit is not ended immediately when the closed state is detected.

8. The method according to claim 7, wherein the first time and the second time are different.

9. The method according to claim 7, further comprising executing a function based on time counted at the counting.

10. A computer-readable recording medium that stores a computer program that implements on a computer a method of controlling a portable device that has a first part, a second part, and a hinge portion, wherein the portable device includes a closed state in which the first part and the second part rotate toward each other and an open state in which the first part and the second part rotate away from each other along the hinge portion, the computer program causing the computer to execute:
   detecting a change in a state from the closed state to the open state or vise versa; and
   counting time until a first time when detecting a change in the state from the closed state to the open state, and counting time until a second time when detecting a change in the state from the open state to closed state;
   wherein said first time is set to be a time on which an application program is set to ON, and said second time is set to be a time on which the application program is set to OFF, and
   wherein said first time is set shorter than the second time, said application program controls a display unit, and said first time is set shorter than the second time such that display on the display unit is performed without delay when the open state is detected, and said second time is set longer than said first time such that display on the display unit is not ended immediately when the closed state is detected.

* * * * *